No. 707,918. Patented Aug. 26, 1902.
L. P. GRAHAM.
CHECK ROW PLANTER.
(Application filed July 3, 1902.)
(No Model.) 2 Sheets—Sheet 1.
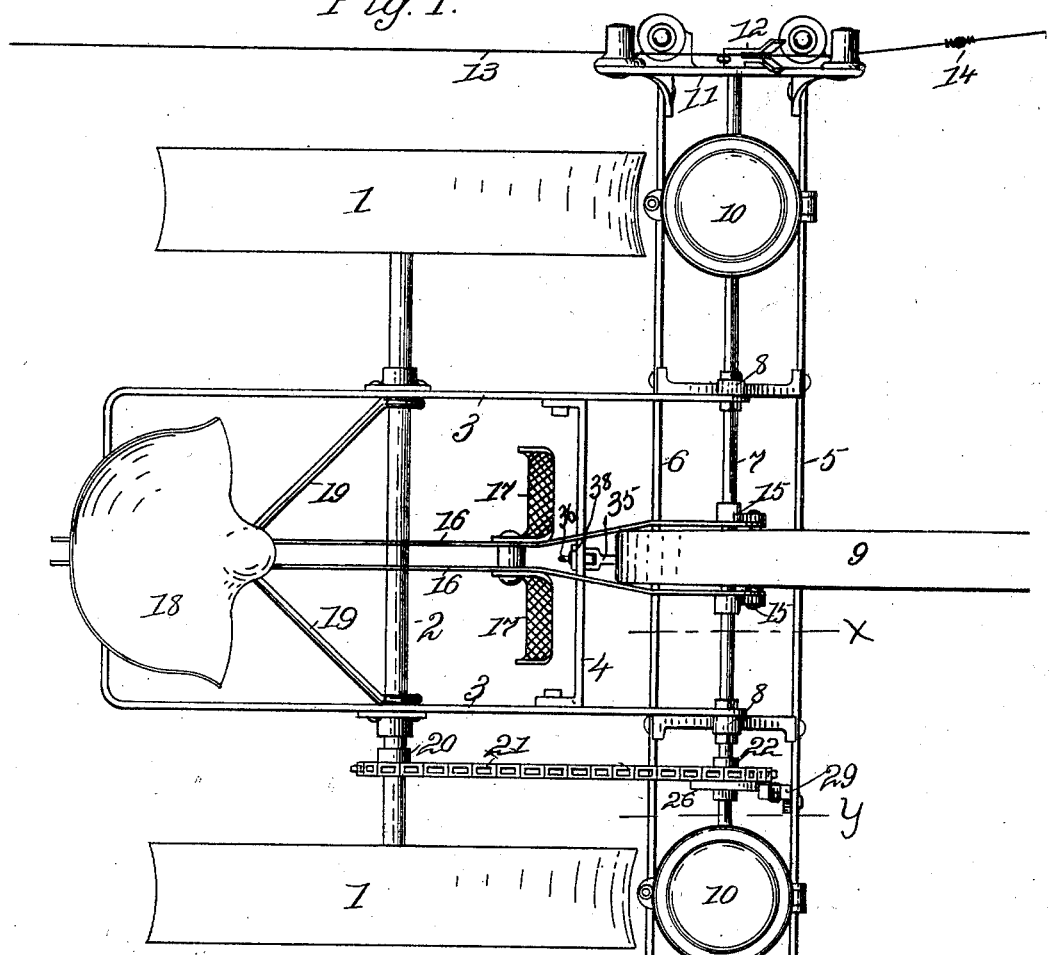
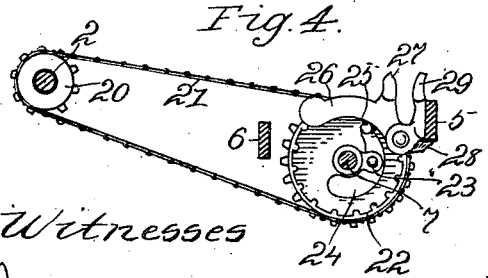
Witnesses
Ina C. Graham
Nora Graham
Inventor
Levi P. Graham No. 707,918. Patented Aug. 26, 1902.
L. P. GRAHAM.
CHECK ROW PLANTER.
(Application filed July 3, 1902.)
(No Model.) 2 Sheets—Sheet 2.
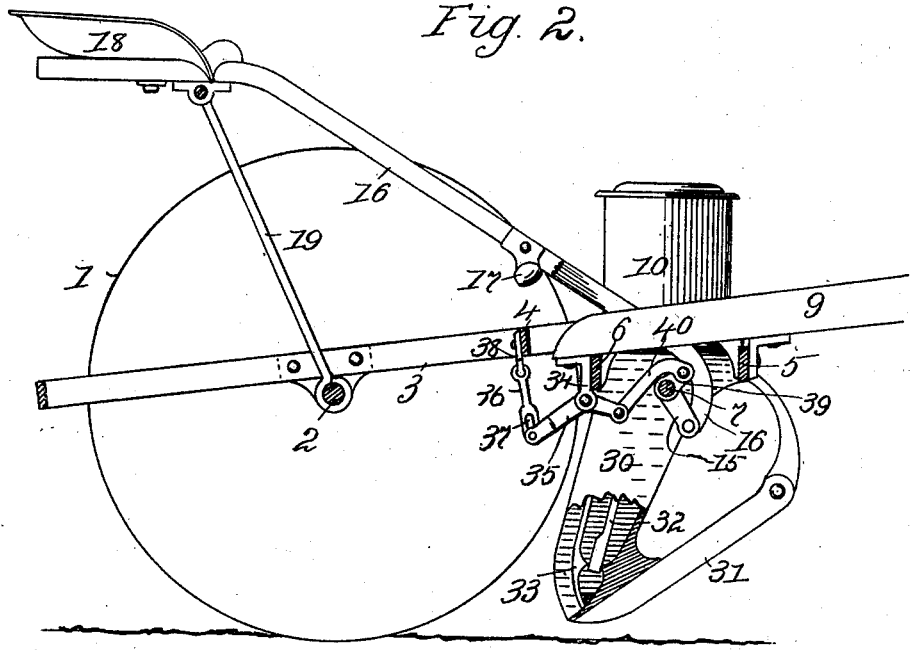
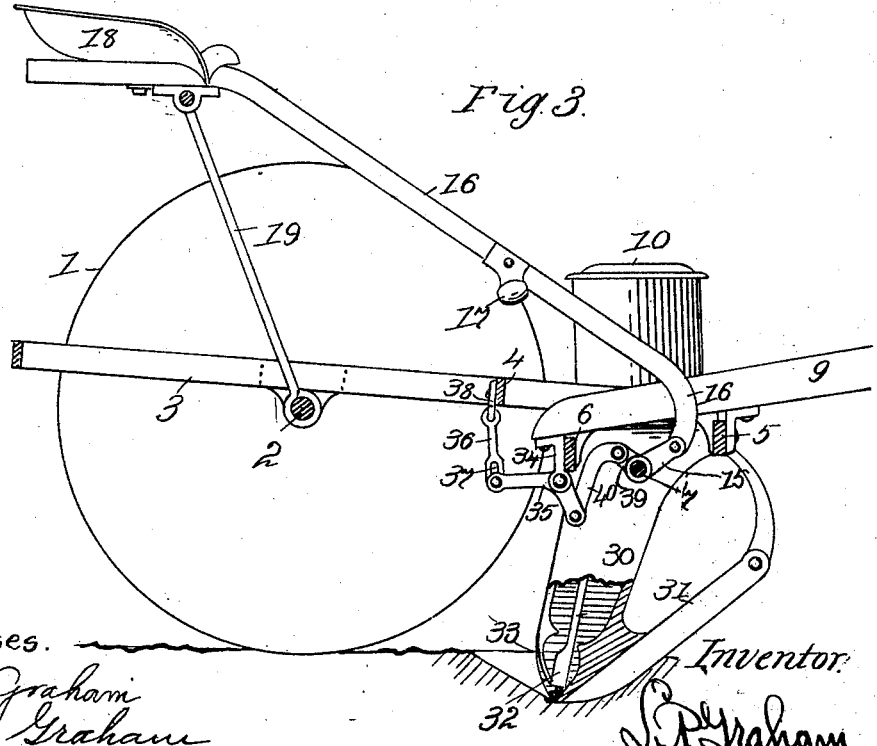

UNITED STATES PATENT OFFICE.

LEVI P. GRAHAM, OF DECATUR, ILLINOIS.

CHECK-ROW PLANTER.

SPECIFICATION forming part of Letters Patent No. 707,918, dated August 26, 1902.

Application filed July 3, 1902. Serial No. 114,307. (No model.)

*To all whom it may concern:*

Be it known that I, LEVI P. GRAHAM, of the city of Decatur, county of Macon, and State of Illinois, have invented certain new and useful Improvements in Check-Row Planters, of which the following is a specification.

One object of this invention is to provide means for moving the front frames of two-frame planters up and down to form depressions at cross-rows for the reception of the seed instead of cutting continuous furrows, and another object is to relieve the seat of the driver from the oscillatory motion of the planter caused by the rise and fall of the front frame.

The invention is exemplified in the structure hereinafter described, and it is defined in the appended claims.

The common method of planting in check-rows involves the waste of force attendant on cutting a trench three feet eight inches long to get room for three grains of corn compactly deposited. The continuous contact of the furrow-openers with the soil accumulates trash in front of the furrow-openers, which increases the needless work imposed on the team. The furrows define gutters to be washed open on hillsides by heavy rains, and the furrows also form paths of least resistance for the travel of vermin from one hill to another. By means of this invention I substitute depressions or very short furrows for the continuous furrows commonly made. I raise the depression-formers clear of the soil after each seed-depositing operation, thus avoiding the dragging of trash, and I entirely obviate the necessity of raising the front frame by hand at the ends of the field preparatory to turning around.

In the drawings forming part of this specification, Figure 1 is a plan of a planter embodying my improvements. Fig. 2 is a section on line X in Fig. 1, showing the planter in the position it maintains as a cross-row is approached. Fig. 3 is a section on line X in Fig. 1, showing the planter in the act of forming depressions in the soil and depositing the seed therein. Fig. 4 is a detail on section-line Y in Fig. 1, showing the means preferably employed in raising the front frame. Fig. 5 is a detail in side elevation of the plunger used to discharge the seed from the planter.

The covering-wheels are shown at 1, the axle-shaft at 2, and the rear frame at 3. At 4 is shown a cross-bar for the rear frame. The cross-bars for the front frame are shown at 5 and 6. A rock-shaft used to actuate the dropping mechanism and raise the front frame is shown at 7. Brackets 8 bridge the space between the cross-bars of the front frame. They are secured to said bars and they provide pivotal connections for the side-bars of the rear frame. The tongue 9 is secured to the front frame. The seedboxes 10 are provided with suitable mechanism for measuring off the grains of seed and dropping them into the shanks, and such mechanism is actuated in any suitable manner from the rock-shaft 7. Check-row heads 11 are fastened on the ends of the front frame. Forked levers 12 are mounted on the ends of shaft 7 in line with the guide-pulleys of the check-row heads, and a check-row wire 13, having knots, as 14, is run through one of the check-row heads and used to rock the shaft 7 backward at cross-rows. Arms 15 are secured to shaft 7, and they extend downward and forward from the shaft when the front frame is raised. Bars 16 curve downward at their front ends and connect pivotally with arms 15. The rearward extensions of bars 16 carry the seat 18, and a bail 19 supports the seat from the axle-shaft 2. A sprocket-wheel 20 is secured to the axle-shaft. A sprocket-wheel 22 is journaled loosely on the rock-shaft 7, and a chain 21 imparts motion derived from a covering-wheel 1 to the wheel 22. A face of sprocket-wheel 22 is recessed and internally toothed, as shown in Fig. 4. An arm 23 is attached to shaft 7 adjacent to wheel 22, and a detent or catch 24 is pivoted between its ends to the swinging end of arm 23. The upper end of the catch-finger 24 is adapted to engage the internally-toothed rim of wheel 22 when shaft 7 is rocked backward, and a pin 25 projects from the engaging end of the catch sidewise and away from the sprocket-wheel. A throw-out arm 26 is pivoted on a bracket attached to the front cross-bar 5 of the front frame, and it extends above the path of pin 25 and normally rests on the pin. When the shaft 7 is rocked backward, the pin 25 swings clear of the throw-out arm and the catch engages a tooth of wheel 22. The arm 26 is sustained in its shown position by an extension 28, which rests against crossbar 5, and as the shaft 7 is rocked forward the pin raises the throw-out arm until the forward rock is nearly completed, when extension 27 of the throw-out strikes an immovable extension 29 on the cross-bar 5 and the catch is forced from engagement with the wheel to swing to its shown position. The means for rocking the rock-shaft forward, described herein, does not of itself form any part of this invention, and it is claimed in Patent No. 701,712, granted to me June 3, 1902. The invention includes means for rocking the shaft 7 forward by force derived from a covering-wheel, and the means herein described is well adapted to accomplish that result. Patent No. 680,326, granted to me August 13, 1901, describes and claims other available means for rocking the rock-shaft forward, and there may of course be still other means.

The shanks 30 for the seedboxes are tubular to convey the seed to the ground, and they are provided with valves, as 33, to temporarily retain the seed. Plungers, as 32, provide means for forcing the seed beyond the valves and depositing it in the depressions made in the soil. When the front frame is raised, the ends of the plungers are above the seed, resting against the lower ends of the valves, and as the shanks enter the soil the plungers force the seed past the valves, as shown in Fig. 3. Inasmuch as the shanks are plunged into the soil and rise at once therefrom, there is no special need for runners; but to aid in penetrating the soil and for cutting through whatever trash or obstructions are encountered during the short contacts of the shanks with the soil runners or cutters of any desired construction may be provided. The oblique cutting-blades 31 partake in part of the nature of runners and in part of the nature of colters, and they are suggestive merely. The plungers 32 are connected with shaft 7 through arms 42, as shown in Fig. 5.

A bracket 34 is secured to the rear crossbars 6 of the front frame, and it provides a fulcrum for a lever 35, one end of which extends forward from the fulcrum, while the other end extends rearward. An arm 39 is attached to shaft 7, a bent link 40 connects the swinging end of arm 39 with the forward end of lever 35, and a link 36 connects the rear extension of the lever with a bracket 38 on cross-bar 4 of the rear frame. The connection of the lever with the rear frame is well to the rear of the hinged conjunction of the two planter-frames, and the front frame is raised by forcing the rear end of the lever downward, and thereby raising the fulcrum or intermediate pivot, as shown in Fig. 2 of the drawings. When the front frame is raised, the arm 39 is rocked forward to an extent sufficient to carry its centers in line with the front end of the lever, and a dead-center lock is formed to hold the front frame raised. When a knot on the check-row wire encounters a fork 12 or when the rock-shaft is given a slight backward motion by any outside influence, the dead-center lock is broken and the front frame at once falls with considerale force, causing the shanks to penetrate the soil and the plungers to expel the seed. The shanks are held some distance above the soil and they acquire momentum from the weight of the front frame in falling. As soon as the momentum is exhausted the shanks begin to ride upward out of the soil, and a little later the forward rock of shaft 7, imparted from the covering-wheels, raises the front frame to the position shown in Fig. 2 preparatory to another operation.

The front frame may be made quite light, as there is but little strain on it. The construction of the second drop is such that the shanks may be set quite close to the covering-wheels and the seat of the driver may be set far enough back to counterbalance all weight in the front frame not actually needed to plunge the shanks into the soil, thus obviating detrimental neck weight. The planter is shown constructed to plant to one depth only, the object being to simplify the drawings; but it is obvious that adjustments may readily be supplied by any mechanic for varying the depth of planting. The link 36 is shown slotted at 37 to provide for a complete backward rock of the rock-shaft in case the shanks should encounter an obstruction sufficiently impenetrable to arrest their descent. The seat is supported from the axle to avoid the rocking motion of the planter-frames, and the brace-bars 16 are connected with arms 15 for the same purpose. As the front frame descends the swinging ends of arms 15 rise correspondingly, or approximately so, and so the driver on the seat is unaffected by the rocking motion. The foot-rest 17 may be carried by the brace-bars, by the axle-shaft, or by the axle and brace-bars together, assuming that the driver does not care to have his feet partake of the motion of the frames. As the front frame is raised after each dropping operation and is held raised by the dead-center lock until the shaft 7 is given initial backward motion, it is obvious that there is no need for the hand-lever commonly used to lift the front frame.

I claim—

1. In a check-row planter, the combination of a rear frame mounted on wheels, a front frame provided with planting mechanism and pivotally conjoined with the rear frame, a rock-shaft in the front frame, means for transmitting motion from a wheel of the rear frame to rock the shaft in one direction, and a connection between the rock-shaft and the rear frame adapted to lift upward on the front frame when the rock-shaft is rocked by the wheel.

2. In a check-row planter, the combination of a rear frame mounted on wheels, a front frame provided with planting mechanism and pivotally conjoined with the rear frame, a rock-shaft in the front frame, means for transmitting motion from a wheel of the rear frame to rock the shaft in one direction, an arm on the rock-shaft, and a connection between the arm and the rear frame adapted to lift upward on the front frame when the rock-shaft is rocked by the wheel.

3. In a check-row planter, the combination of a rear frame mounted on wheels, a front frame provided with planting mechanism and pivotally conjoined with the rear frame, a rock-shaft in the front frame, means for transmitting motion from a wheel of the rear frame to rock the shaft in one direction, an arm on the rock-shaft, a link pivotally connected with the arm on the rock-shaft and forming with the arm a dead-center lock when the front frame is raised, and a connection between the link and the rear frame whereby the front frame is lifted when the shaft is rocked by the wheel.

4. In a check-row planter, the combination of a rear frame mounted on wheels, a front frame provided with planting mechanism and pivotally conjoined with the rear frame, a rock-shaft in the front frame, means for transmitting motion from a wheel of the rear frame to rock the shaft in one direction, an arm on the rock-shaft, a lever fulcrumed in the front frame a link connecting an end of the lever with the arm on the rock-shaft, and a connection between the other end of the lever and the rear frame back of the pivotal conjunction of the two frames.

5. In a check-row planter, the combination of a rear frame mounted on wheels, a front frame provided with planting mechanism and pivotally conjoined with the rear frame, a rock-shaft in the front frame, means for transmitting motion from a wheel of the rear frame to rock the shaft in one direction, a connection between the rock-shaft and the rear frame adapted to lift upward on the front frame when the shaft is rocked by the wheel, and a forked lever connected with the shaft and adapted to be actuated by knots on a check-row wire.

6. In a check-row planter, the combination of a rear frame mounted on wheels, a front frame provided with planting mechanism and pivotally conjoined with the rear frame, a rock-shaft in the front frame, means for transmitting motion from a wheel of the rear frame to rock the shaft in one direction, a connection between the rock-shaft and the rear frame adapted to lift upward on the front frame when the shaft is rocked by the wheel, an arm on the rock-shaft extending forward and downward when the front frame is raised and extending forward and upward when the front frame is lowered, and a seat-carrying bar pivotally connected at its front end with the arm of the rock-shaft.

7. In a check-row planter, the combination of a rear frame mounted on wheels, a front frame provided with planting mechanism and having up-and-down motion, means for actuating the seed-dropping mechanism of the front frame simultaneous with the fall of the front frame, and means, set in motion by the fall of the front frame, for raising the front frame by force derived from a wheel of the rear frame.

In testimony whereof I sign my name in the presence of two subscribing witnesses.

LEVI P. GRAHAM.

Witnesses:
   E. S. McDONALD,
   ROSA VOELCKER.